US005315278A

United States Patent [19]

Demere et al.

[11] Patent Number: 5,315,278

[45] Date of Patent: May 24, 1994

[54] FILAMENT MAGNETIC FLUX CIRCUIT

[75] Inventors: Sims B. Demere, Newport News; Benjamin F. Brinn, Jr., Williamsburg; John S. Bright; Kenric J. Johnson, both of Newport News, all of Va.

[73] Assignee: Siemens Automotive L.P., Auburn Hills, Mich.

[21] Appl. No.: 922,454

[22] Filed: Jul. 30, 1992

[51] Int. Cl.[5] ........................ H01F 5/00; H01F 27/24; H02K 33/00; F16K 31/02

[52] U.S. Cl. .................................... 335/282; 335/281; 335/279; 310/15; 336/213; 336/84 C; 336/234; 251/129.15

[58] Field of Search ............... 335/281, 282, 236, 279; 336/84 C, 84 M, 198, 213, 177, 234; 310/23, 27, 30, 34, 15

[56] References Cited

U.S. PATENT DOCUMENTS 847,008 3/1907 Kitsee ................................. 335/297
2,958,057 10/1960 Berman ................................ 336/135
3,956,651 5/1976 Brammerlo .......................... 310/218
3,983,433 9/1976 Sims ................................... 310/254
3,983,434 9/1976 Sims ................................... 310/254
3,983,435 9/1976 Sims ................................... 310/254

FOREIGN PATENT DOCUMENTS 0009442 6/1991 European Pat. Off. ............ 336/177

*Primary Examiner*—Leo P. Picard
*Assistant Examiner*—Stephen T. Ryan
*Attorney, Agent, or Firm*—George L. Boller; Russel C. Wells

[57] ABSTRACT

A length of wire is toroidally wound, and then the toroid is encapsulated and cut in two along a plane that is perpendicular to the toroidal axis. The resulting portions are used as stator and/or armature of a solenoid, and in the solenoid the cut face of each forms one side of the solenoid's working gap so that the faces move toward and away from each other as the solenoid operates.

17 Claims, 4 Drawing Sheets

FILAMENT MAGNETIC FLUX CIRCUIT

FIELD OF THE INVENTION

This invention relates generally to solenoids and methods of making them.

BACKGROUND AND SUMMARY OF THE INVENTION

The state of the art contains a substantial number of patents relating to solenoids for valves, such as solenoids for fuel injectors. Typically, a solenoid valve comprises an armature that reciprocates between a first and second position for causing a valve member such as a needle to seat on and unseat from a valve seat thereby closing and opening the valve. The basic solenoid design comprises an electromagnetic coil and a ferromagnetic pole forming a stator, and a ferromagnetic armature that is connected to the valve member. The armature is kept separated from the stator by a force such as gravity, spring, or pressure.

One of the factors slowing the response time of the solenoid is eddy current generation in the ferromagnetic materials. When the solenoid is energized, eddy currents tend to inhibit the rate at which the magnetic force builds. Likewise, eddy currents tend to inhibit the rate at which the magnetic force decays upon solenoid de-energization.

Previous methods of reducing eddy currents have involved laminating the ferromagnetic material. The lamination approach, however, tends to be limited to a rectangular package. Unfortunately, fitting the lamination design into a cylindrical package like a typical fuel injector results in either a larger cylindrical package or a smaller flux path with reduced force output.

It is seen then that there still exists a need for further reducing eddy currents in a the solenoid of a cylindrically shaped valve, like a typical fuel injector.

This need is met by a low eddy current magnetic flux circuit according to the present invention, wherein a magnetically permeable wire, or filament, is toroidally wound on a tubular electromagnetic coil, and then encapsulated. The assembly is then severed into two parts, namely a stator assembly and an armature assembly.

For a fuller understanding of the present invention and its attendant features and advantages, reference may be had to the following detailed description taken in conjunction with the accompanying drawings and the appended claims.

DESCRIPTION OF THE PREFERRED EMBODIMENT

Although, the present invention is particularly suitable for use with a high-speed solenoid valve for automotive fuel injection, it may be extended to any solenoid application where fast speed of response is of primary importance.

Figure 1:
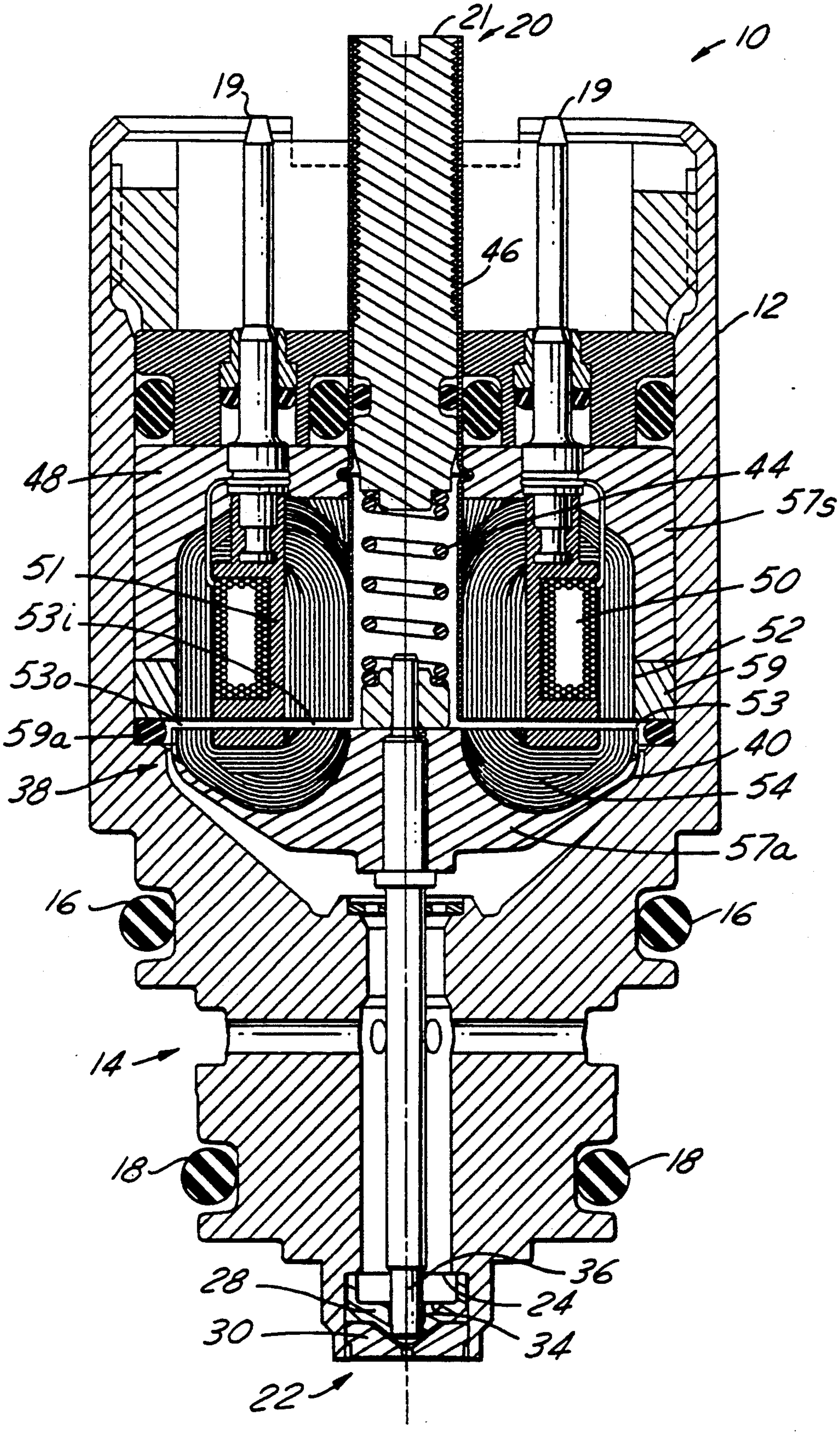
FIG. 1 is a longitudinal cross sectional view of a fuel injector including a filament magnetic flux circuit of the present invention.

Referring now to the drawings, FIG. 1 illustrates application of the invention to a spherical needle and cone seat fuel injector 10 including a tubular housing 12 made from non-magnetic stainless steel. The inside of housing 12 contains a plurality of different diameters to form various shoulders for a variety of different functions. Seated in grooves around the outside of housing 12 to either side of an inlet 14 are O-ring seals 16 and 18 for sealing fuel injector 10 in a bore of an engine or manifold when in use. Housing 12 has an upper end 20 containing an adjusting mechanism 21 and two electrical terminals 19 for connecting the fuel injector to an electric control circuit (not shown). It also has a lower outlet, or nozzle, end 22 that injects fuel from the injector. Outlet end 22 has a shoulder 24 for locating a seat member 30 and a swirl member 28 that are assembled into the outlet end. Member 28 has an axially aligned through-hole 34 for guiding the reciprocation of a needle 36.

Needle 36 has a rounded tip at one end for coaction with a conical valve seat in the interior face of seat member 30. At the opposite end, needle 36 is attached to an armature assembly 40. Mechanism 21 comprises a spring 44 which is disposed inside a tube 46 to bias needle 36 to seat on the valve seat thus biasing the fuel injector closed.

The injector has a solenoid 38 that is constituted by armature assembly 40 and a stator assembly 48. The stator assembly comprises a tubular electromagnetic coil 50 in the form of multiple convolutions of electrical conductor wire wound on a bobbin 51. The stator and armature assemblies are separated by a working gap 53 which has a radially outer annular portion 53*o* and a radially inner annular portion 53*i*. In cooperation with said working gap, the stator and armature assemblies form a closed path for magnetic flux issued by coil 50 when electric current flows through its conductor wire.

In accordance with the invention, at least one of said armature and said stator assemblies comprises a truncated toroidal winding composed of a multitude of individual magnetically permeable wires which are distributed collectively around said one of said armature and said stator assemblies and each of which individually has one end terminus disposed at said radially inner annular zone 53*i* of said working gap and an opposite end terminus disposed at said radially outer annular zone 53*o* of said working gap. In FIG. 1, both stator and armature assemblies are so constructed. In each a respective binding structure 57*a*, 57*s*, respectively, immovably binds said multitude of individual magnetically permeable wires 54, 52, respectively, together. In the stator assembly, the multitude of individual magnetically permeable wires are distributed collectively around coil 50. In both the stator and armature, said binding structure comprises encapsulating material encapsulating the entirety of the multitude of magnetically permeable wires except at said end termini thereof and said end termini of each are disposed in a common plane in each assembly. In the described application of the solenoid to a fuel injector, a circular groove is provided in binding structure 57*a* for receiving a metal ring 59 which bears against an annular spacer 59*a* on an internal shoulder of housing 12.

Figure 3:
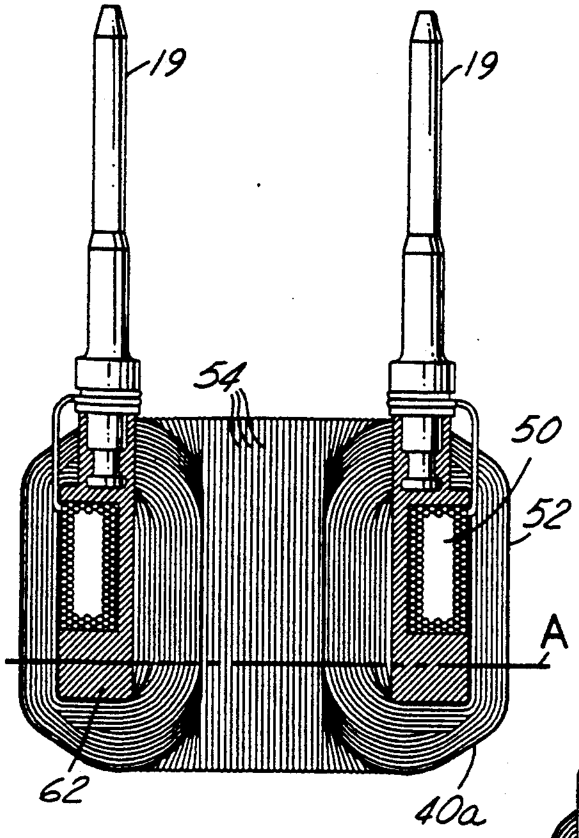
FIGS. 3 and 4 illustrate cutting planes to achieve particular configurations for toroidal filament magnetic flux circuits.

The invention also comprises a method of making one or both of a stator assembly and an armature assembly of a solenoid, said solenoid comprising multiple convolutions of electrical conductor wire forming a tubular electromagnetic coil, a stator and an armature which are separated by a working gap and which, in cooperation with said working gap, form a closed path for magnetic flux issued by said electromagnetic coil when electric current flows through said conductor wire. As shown by FIG. 3, the method comprises creating said armature and stator assemblies by toroidally winding a length of magnetically permeable wire 52, 54 about said electromagnetic coil 50 to create a toroidal winding surrounding said electromagnetic coil, and then encapsulating said toroidal winding in an encapsulating material (not shown in FIG. 3) to immovably bind the individual turns of said toroidal winding. Finally, a portion of the encapsulated toroidal winding is severed in a plane A as shown by FIG. 3 so as to create an armature assembly composed of a multitude of individual magnetically permeable wires which are derived from said toroidal winding to form said armature, each of which individually has one end terminus disposed in the fuel injector at a radially inner annular zone of said working gap and an opposite end terminus disposed in the fuel injector at a radially outer annular zone of said working gap, and which are immovably bound together in said armature assembly by said encapsulating material, and so as to simultaneously create a stator assembly having as said stator another multitude of individual magnetically permeable wires which are derived from said toroidal winding, each of which individually has one end terminus disposed in the fuel injector at said radially inner annular zone of said working gap and extends in partial embracement of said electromagnetic coil to an opposite end terminus disposed in the fuel injector at said radially outer annular zone of said working gap, and which are immovably bound together in said stator assembly by said encapsulating material.

The method is characterized further in that said severing step is conducted in a flat plane that is perpendicular to the axis of said electromagnetic coil.

The method is characterized still further in that bobbin 51 has a flange 62 beyond one axial end of coil 50 and said severing step is conducted through the middle of said bobbin flange. The bobbin flange may be considered to be a spacer.

Figure 4:
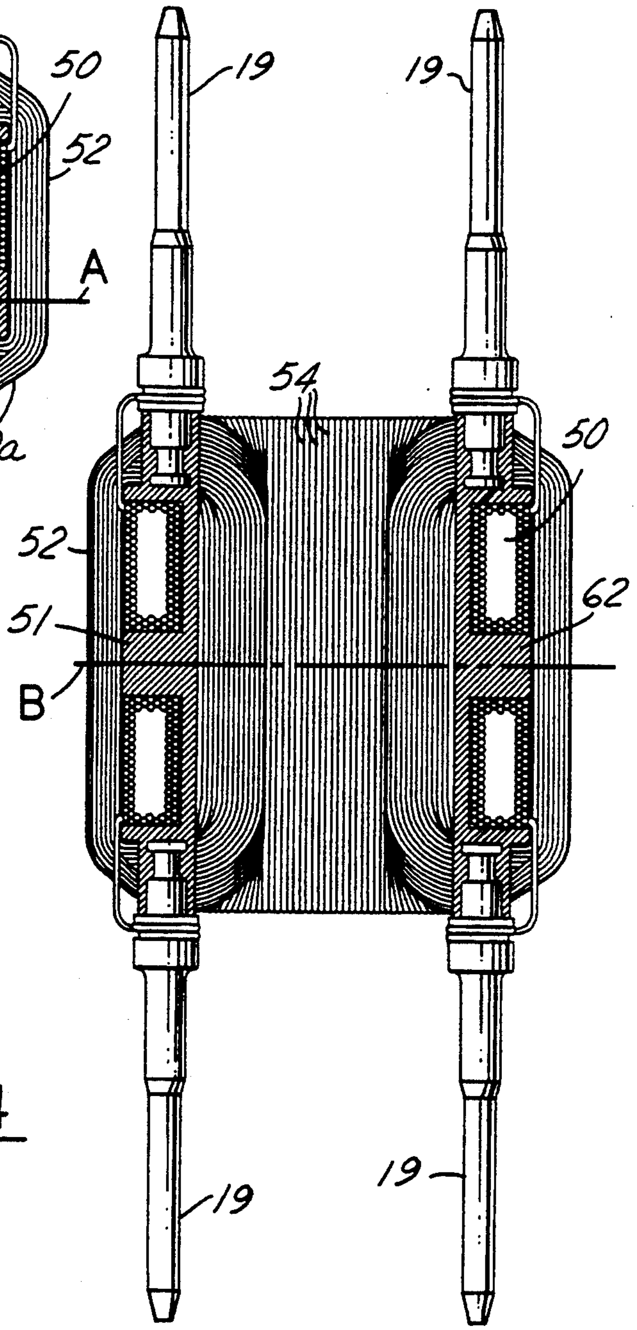
Figure 5:
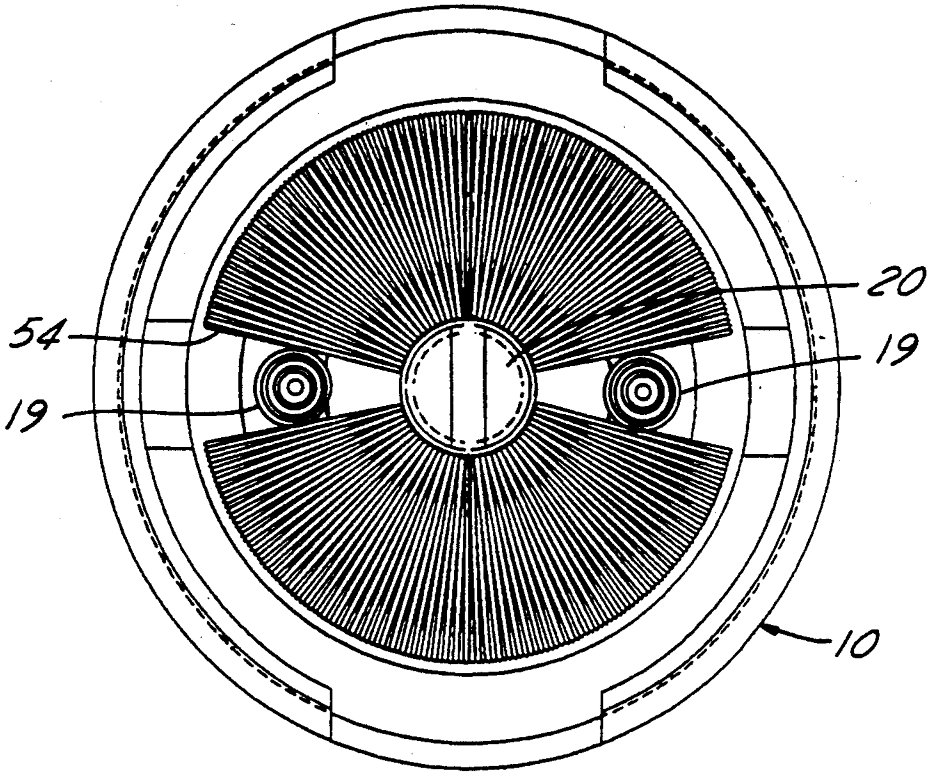
FIG. 5 is a top view representative of FIGS. 1 and 2.

FIG. 4 shows a method of using the invention to make two stator assemblies by severing the encapsulated toroid in the middle at plane B. Note that the toroidally wound iron wire is wound so as to allow the terminals 19 that are connected to coil 50 to protrude through.

Figure 2:
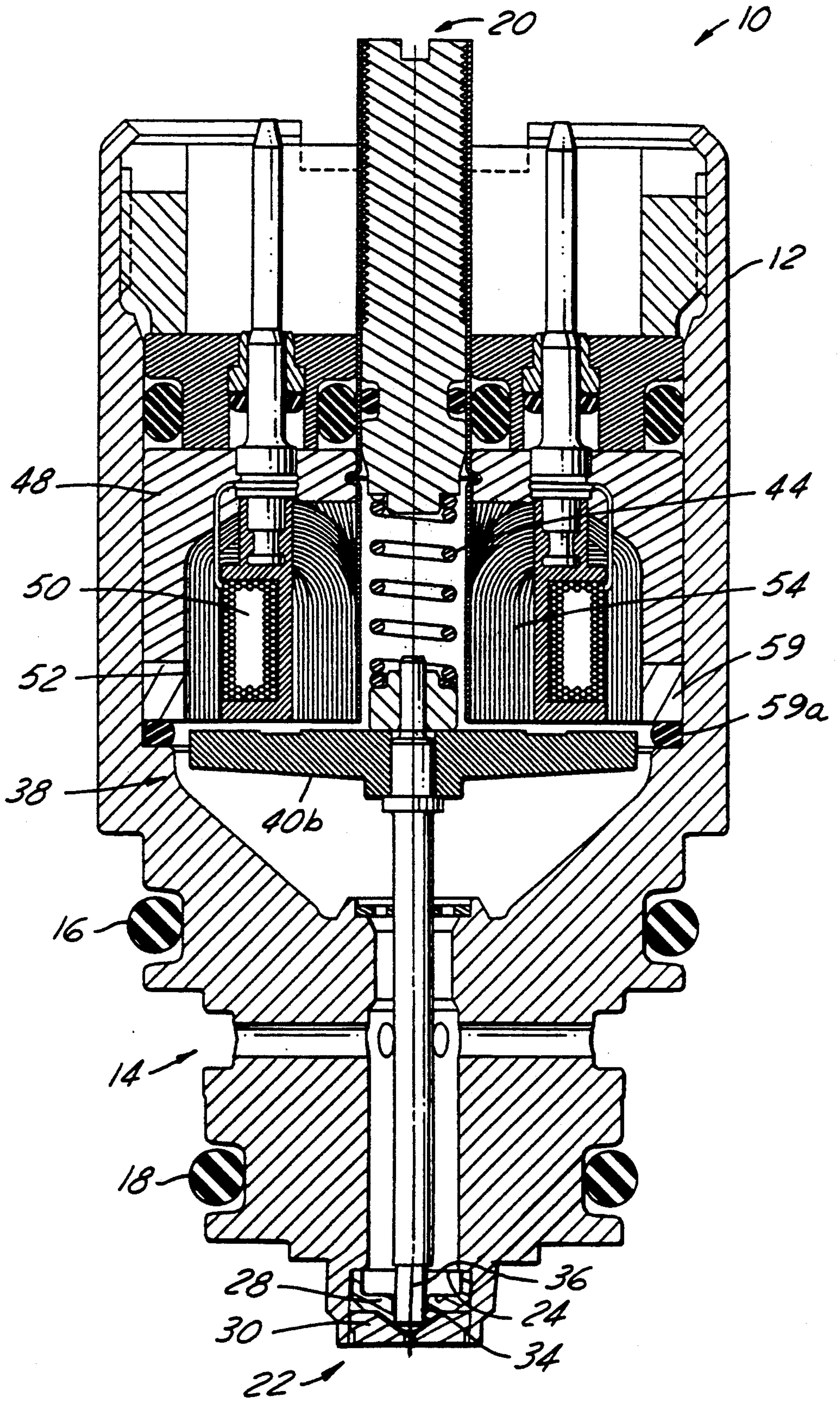
FIG. 2 is a longitudinal cross sectional view of an alternative embodiment.

FIG. 2 shows an embodiment where only the stator assembly of the invention is used, the armature being merely a ferromagnetic disk 40*b*.

The filament 52, 54 is preferably a drawn wire of an optimized ferromagnetic material. It may be coated with an insulation (similar to magnet wire) to maximize the reduction of eddy currents. The particular ferromagnetic material selected may be optimized for desired properties, for example to optimize the hysteresis curve, to maximize resistivity for the purpose of further reducing eddy currents, and to optimize filament processing. The filament's shape may be selected to optimize packing. The fact that the filament is drawn enhances its properties because of grain orientation. For a given package size for a solenoid, minimizing the filament size, for optimizing the speed of the solenoid, must be weighed against the increased cost to manufacture a solenoid having a smaller filament size.

Having described the invention in detail and by reference to the preferred embodiment thereof, it will be apparent that other modifications and variations are possible without departing from the scope of the invention defined in the appended claims.

What is claimed is:

1. A solenoid comprising multiple convolutions of electrical conductor wire forming a tubular electromagnetic coil, a stator and an armature which are separated by a working gap and which, in cooperation with said working gap, form a closed path for magnetic flux issued by said electromagnetic coil when electric current flows through said conductor wire, said armature being arranged for linear motion along an axis toward and away from said stator so as to change the distance between them across said working gap as a function of current flow through said conductor wire, characterized in that one of said armature and said stator comprises a truncated toroidal winding composed of a multitude of individual magnetically permeable wires which are distributed collectively around said one of said armature and said stator and each of which individually has one end terminus disposed at a radially inner annular zone of said working gap and an opposite end terminus disposed at a radially outer annular zone of said working gap, and in that binding structure immovably binds said multitude of individual magnetically permeable wires together in said one of said armature and stator.

2. A solenoid as set forth in claim 1 characterized further in that the other of said armature and said stator comprises a truncated toroidal winding composed of a multitude of individual magnetically permeable wires which are distributed collectively around said other of said armature and said stator and each of which individually has one end terminus disposed at said radially inner annular zone of said working gap and an opposite end terminus disposed at said radially outer annular zone of said working gap, and in that additional binding structure immovably binds said last-mentioned multitude of individual magnetically permeable wires together in said other of said armature and stator.

3. A solenoid as set forth in claim 1 characterized further in that said one of said armature and said stator is said stator and said multitude of individual magnetically permeable wires are distributed collectively around said electromagnetic coil.

4. A solenoid as set forth in claim 1 characterized further in that said binding structure comprises encapsulating material encapsulating the entirety of said multitude of magnetically permeable wires except at said end termini thereof.

5. A solenoid as set forth in claim 4 characterized further in that said end termini are disposed in a common plane.

6. A solenoid comprising multiple convolutions of electrical conductor wire forming a tubular electromagnetic coil, a stator and an armature which are separated by a working gap and which, in cooperation with said working gap, form a closed path for magnetic flux issued by said electromagnetic coil when electric current flows through said conductor wire, characterized in that one of said armature and said stator comprises a truncated toroidal winding composed of a multitude of individual magnetically permeable wires which are distributed collectively around said one of said armature and said stator and each of which individually has one end terminus disposed at a radially inner annular zone of said working gap and an opposite end terminus disposed at a radially outer annular zone of said working gap, in that binding structure immovably binds said multitude of individual magnetically permeable wires together in said one of said armature and stator, and in that the other of said armature and said stator comprises a truncated toroidal winding composed of a multitude of individual magnetically permeable wires which are distributed collectively around said other of said armature and said stator and each of which individually has one end terminus disposed at said radially inner annular zone of said working gap and an opposite end terminus disposed at said radially outer annular zone of said working gap, and in that additional binding structure immovably binds said last-mentioned multitude of individual magnetically permeable wires together in said other of said armature and stator.

7. A solenoid as set forth in claim 6 characterized further in that said end termini are disposed in a common plane.

8. A solenoid as set forth in claim 6 characterized further in that said binding structure comprises encapsulating material encapsulating the entirety of said multitude of magnetically permeable wires except said end termini thereof.

9. A solenoid as set forth in claim 6 characterized further in that said end termini are disposed in a common plane, and said binding structure comprises encapsulating material encapsulating the entirety of said multitude of magnetically permeable wires except at said end termini thereof.

10. A solenoid comprising multiple convolutions of electrical conductor wire forming a tubular electromagnetic coil, a stator and an armature which are separated by a working gap and which, in cooperation with said working gap, form a closed path for magnetic flux issued by said electromagnetic coil when electric current flows through said conductor wire, characterized in that one of said armature and said stator comprises a truncated toroidal winding composed of a multitude of individual magnetically permeable wires which are distributed collectively around said one of said armature and said stator and each of which individually has one end terminus disposed at a radially inner annular zone of said working gap and an opposite end terminus disposed at a radially outer annular zone of said working gap, in that binding structure immovably binds said multitude of individual magnetically permeable wires together in said one of said armature and stator, and in that said end termini are disposed in a common plane.

11. A solenoid as set forth in claim 10 characterized further in that said binding structure comprises encapsulating material encapsulating the entirety of said multitude of magnetically permeable wires except at said end termini thereof.

12. A solenoid comprising multiple convolutions of electrical conductor wire forming a tubular electromagnetic coil, a stator and an armature which are separated by a working gap and which, in cooperation with said working gap, form a closed path for magnetic flux issued by said electromagnetic coil when electric current flows through said conductor wire, characterized in that one of said armature and said stator comprises a truncated toroidal winding having truncation transverse to a toroidal axis and composed of a multitude of individual magnetically permeable wires which are distributed collectively around said one of said armature and said stator and each of which individually has one end terminus disposed at a radially inner annular zone of said working gap relative to the toroidal axis and an opposite end terminus disposed at a radially outer annular zone of said working gap relative to the toroidal axis, magnetic flux passes across said working gap between said stator and said armature in a direction generally parallel to the toroidal axis, and in that binding structure immovably binds said multitude of individual magnetically permeable wires together in said one of said armature and stator.

13. A solenoid as set forth in claim 12 characterized further in that the other of said armature and said stator comprises a truncated toroidal winding composed of a multitude of individual magnetically permeable wires which are distributed collectively around said other of said armature and said stator and each of which individually has one end terminus disposed at said radially inner annular zone of said working gap and an opposite end terminus disposed at said radially outer annular zone of said working gap, and in that additional binding structure immovably binds said last-mentioned multitude of individual magnetically permeable wires together in said other of said armature and stator.

14. A solenoid as set forth in claim 12 characterized further in that said one of said armature and said stator is said stator and said multitude of individual magnetically permeable wires are distributed collectively around said electromagnetic coil.

15. A solenoid as set forth in claim 12 characterized further in that said end termini are disposed in a common plane.

16. A solenoid as set forth in claim 12 characterized further in that said binding structure comprises encapsulating material encapsulating the entirety of said multitude of magnetically permeable wires except at said end termini thereof.

17. A solenoid as set forth in claim 12 characterized further in that said end termini are disposed in a common plane and in that said binding structure comprises encapsulating material encapsulating the entirety of said multitude of magnetically permeable wires except at said end termini thereof.

* * * * *